United States Patent [19]

Islam

[11] Patent Number: 5,086,386
[45] Date of Patent: Feb. 4, 1992

[54] METHOD AND APPARATUS FOR BENCHMARKING THE WORKING SET OF WINDOW-BASED COMPUTER SYSTEMS

[75] Inventor: Nayeem Islam, Mountain View, Calif.

[73] Assignee: Sun Microsystems, Inc., Mountain View, Calif.

[21] Appl. No.: 497,998

[22] Filed: Mar. 23, 1990

[51] Int. Cl.$^5$ .............................................. G06F 7/00
[52] U.S. Cl. ................................. 395/600; 364/28 L; 364/285; 364/DIG. 1; 364/DIG. 2
[58] Field of Search ... 364/200 MS File, 900 MS File

[56] References Cited

PUBLICATIONS

Jacobs, T., "The XView ToolKit: An Architectural Overview", Sun Microsystems, 1988.
Gaylin, K., "How are Windows Used? Some Notes on Creating an Empirically Based Windowing Benchmark Task", CHI Proceedings, Apr. 1986, pp. 96–100.
Islam et al., "Testing Window Systems", Interfaces: Systems and People Working Together, 28th Annual Tech. Symposium, ACM. Wash., 1989, pp. 95–103.
CAPBAK/UNIX-Keystroke Capture and Replay System, Software Research, Inc., 1989,
Scheifler et al., "The X Window System", ACM Transactions on Graphics, vol. 5, No. 2, Apr. 1986, pp. 79–109.

Primary Examiner—Thomas M. Heckler
Attorney, Agent, or Firm—Blakely Sokoloff Taylor & Zafman

[57] ABSTRACT

In the system of the present invention, the performance of distributed window systems which employ shared libraries is provided. A shared library is a library which is referenced and accessed by multiple processes. Synchronization events are preset in a journal file which, during playback of the same, trigger a mechanism which reads the page table of the current applications. Once the playback is complete, the page table measurements taken during playback are reviewed and information is extracted which is used to determine the working set for shared libraries. Using the working set, the number of pages referenced and the rate of reference can be used to improve performance and predict behavior of other systems.

17 Claims, 19 Drawing Sheets

LOGIN AS "TESTUSER"

EXECUTE XNEWS

START CONSOLE
START CMDTOOL
START TEXTEDIT
START MAILTOOL
    CONSOLE CLICK IN WINDOW FOR FOCUS
    CONSOLE LS -L
    CONSOLE GREP INCLUDE *.C
    CONSOLE CP MAILBOX.DEFAULT/VAR/SPOOL/MAIL/$USER
    CONSOLE CP -R MAILDIR.DEFAULT MAILDIR

MAILTOOL OPEN WITH ICON MENU
    MAILTOOL MOVE MAIL WINDOW TO LOWER RIGHT USING MOUSE
    ACCELERATOR
    MAILTOOL NEWMAIL OR FILE/HOME
    MAILTOOL MOVE THE VIEWING WINDOW TO THE UPPER RIGHT PART OF THE
SCREEN.
    DO NOT COVER THE ICONS. USE MOUSE ACCELERATOR
    MAILTOOL COMPOSE BUTTON
    MAILTOOL CLICK IN COMPOSE WINDOW TO FIELD FOR FOCUS
    MAILTOOL TYPE IN <TESTUSER> IN THE RECIPIENTS FIELD
    MAILTOOL GOTO SUBJECT FIELD
    MAILTOOL TYPE IN "TEST" IN THE SUBJECT FIELD
    MAILTOOL GOTO BODY OF MESSAGE AND CLICK FOR FOCUS
    MAILTOOL TYPE IN "THIS IS A TEST." IN BODY OF MESSAGE FIELD.
    MAILTOOL DELIVER BUTTON
    MAILTOOL NEWMAIL OR FILE/HOME
    CONSOLE CLICK ON FRAME TO BRING TO TOP
    CONSOLE CLICK IN WINDOW FOR FOCUS
    CONSOLE EGREP THE TEXT.PROC.BENCH.INPUT
    CONSOLE VI USER.PS-
    CONSOLE G
    CONSOLE:%S/I/I/
    CONSOLE IG
    CONSOLE :Q! (TO EXIT FROM VI)
    CONSOLE LS -L
    TEXTEDIT OPEN WITH MOUSE ACCELERATOR
    TEXTEDIT MOVE WINDOW TO LOWER LEFT OF DESKTOP, SO THAT THE CONSOLE
    IS PARTLY COVERED - USE MOUSE ACCELERATOR

TEXTEDIT   CLICK ON FILE BUTTON
    TEXTEDIT   TYPE "PSU.C"
    TEXTEDIT   CLICK ON LOAD FILE BUTTON
    TEXTEDIT RESIZE WINDOW - DON'T REALLY CHANGE SIZE,
    JUST LEAVE IT AS IT IS - USE MOUSE ACCELERATOR
    TEXTEDIT USE MENU TO LAYER TO BACK (BEHIND CONSOLE)

CMDTOOL OPEN WITH MOUSE ACCELERATOR
    CMDTOOL MOVE WINDOW TO UPPER RIGHT OF DESKTOP, SO THAT THE MAILTOOL
    IS PARTLY COVERED, BUT THE CLOCK IS NOT COVERED - USE MOUSE
ACCELERATOR

CMDTOOL RESIZE WINDOW - SO THAT IT DOES NOT OVERLAP EITHER CONSOLE
OR

Fig 4

```
TEXTEDIT - USE MOUSE ACCELERATOR
CMDTOOL CLICK IN WINDOW TO GET FOCUS
CMDTOOL CP TEXT.PROC.BENCH.INPUT FOO
CMDTOOL RM FOO
CMDTOOL MAIL 'WHOAMI'@'HOSTNAME'
CMDTOOL TYPE "THIS IS A TEST"
CMDTOOL CTLR-R (TO TERMINATE MAIL)
CONSOLE CLICK ON FRAME TO MOVE TO TOP
CONSOLE CLICK ON WINDOW FOR FOCUS
CONSOLE SCROLL BACK ONE PAGE
CONSOLE CLICK ON FIRST "L" OF "LS -L"
CONSOLE USE DRAG SELECT TO SELECT "LS -L<CR>" (USING LEFT BUTTON)
CONSOLE USE MENU TO COPY TEXT TO CLIPBOARD
CMDTOOL CLICK FOR FOCUS AR C-SHELL PROMPT
CMDTOOL USE MENU TO PASTE "LS -L<CR>" IN WINDOW

CONSOLE USE FRAME MENU TO LAYER IT BEHIND THE TEXTEDIT WINDOW

TEXTEDIT USE TRIPLE CLICK TO SELECT THE LINE "# INCLUDE <SYS/WAIT.H>

TEXTEDIT MENU EDIT/COPY TO COPY THE SELECTION
TEXTEDIT CLICK ON THE LINE BELOW "# INCLUDE <SYS/WAIT.H>
TEXTEDIT MENU EDIT/PASTE TO PASTE IN THE SELECTION
TEXTEDIT FIND/FIND AND REPLACE MENU

FIND&REPLACE CLICK ON THE FIND FIELD
FIND&REPLACE TYPE "IF"
FIND&REPLACE CLICK ON REPLACE FIELD
FIND&REPLACE TYPE "IF"
FIND&REPLACE PRESS REPLACE ALL BUTTON
FIND&REPLACE QUIT WINDOW (PRESS DONE BUTTON)

TEXTEDIT USE TRIPLE CLICK TO SELECT THE LINE "#INCLUDE <SYS/WAIT.H>
TEXTEDIT MENU EDIT/CUT TO CUT THE SELECTION
TEXTEDIT USE MENU FILE/SAVE CURRENT FILE TO SAVE FILE

CMDTOOL USE FRAME MENU TO REDISPLAY/ REFRESH WINDOW
CMDTOOL CLICK IN WINDOW FOR FOCUS
CMDTOOL VI USER.PS-
CMDTOOL CTRL-F
CMDTOOL CTRL-F
CMDTOOL G
CMDTOOL ZZ (TO EXIT FROM VI)
CMDTOOL NROFF TEXT.PROC.BENCH.INPUT > FOO
CMDTOOL RM FOO
CMDTOOL USE FRAME MENU TO CLOSE TO ICON
MAILTOOL CLICK ON FRAME TO BRING TO TOP
MAILTOOL NEXT BUTTON
MAILTOOL DELETE BUTTON
MAILTOOL PRINT BUTTON
MAILTOOL CLICK IN FOLDER NAME FIELD
MAILTOOL TYPE"PAW" INTO FOLDER NAME FIELD
MAILTOOL USE MENUS (FILE->MOVE->TO//)
MAILTOOL POP UP FRAME COMES UP. TYPE IN DESTINATION.
```

Fig 4

MAILTOOL CLICK FOLDER BUTTON (THE FIRST MESSAGE IN THE FOLDER IS
AUTOMATICALLY OPENED FOR VIEWING)
MAILTOOL BRING VIEWING WINDOW TO THE TOP
MAILTOOL SELECT (FILE->OPEN FOLDER) FROM MENU
MAILTOOL MOUSE TO DISPLAY SCROLLBAR
MAILTOOL SCROLL DOWN ONE PANE (THIS MESSAGE IS BETWEEN 1 AND 2
PANES IN SIZE)
CONSOLE USE MOUSE ACCELERATOR TO LAYER TO TOP
CONSOLE CLICK FOR FOCUS IN WINDOW
CONSOLE FGREP ECHO[HL]?
CONSOLE LS -L
CONSOLE CAT IO.C
CONSOLE GOTO SCROLLBAR
CONSOLE SCROLL BACKWARDS 1 PANE
CONSOLE SCROLL BACKWARDS 1 PANE
CONSOLE SCROLL BACKWARDS 1 PANE
CONSOLE SCROLL FORWORD 1 LINE
CONSOLE SCROLL FORWORD 1 LINE
CONSOLE SCROLL FORWORD 1 LINE
CONSOLE SCROLL TO END OF TEXT
CONSOLE USE FRAME MENU TO LAYER TO BOTTOM

TEXTEDIT CLOSE WINDOW TO ICON USING MOUSE ACCELERATOR
CMDTOOL OPEN WITH MOUSE ACCELERATOR
CMDTOOL CLICK IN WINDOW FOR FOCUS
CMDTOOL CAT *.C .. FOO
CMDTOOL RM FOO
CMDTOOL LS -L
CONSOLE RM*%
CONSOLE RM/VAR/SPOOL/MAIL/$USER

MAILTOOL CLICK WITH MOUSE ON FRAME TO LAYER TO FRONT
MAILTOOL DOUBLE CLICK ON LAST MESSAGE IN HEADERS
MAILTOOL SELECT "QUIT" FROM FRAME MENU   VIEWING WINDOW
SELECT ALL TOOLS THEN QUIT

Fig 4

LOGIN AS "TESTUSER"

EXECUTE XNEWS

<START JOURNALLING HERE>

| | |
|---|---|
| START CONSOLE | (IT GOES IN THE UPPER LEFT CORNER) |
| START CMDTOOL | (IT GOES ICONIC IN THE UPPER RIGHT) |
| START TEXTEDIT | (IT GOES ICONIC IN UPPER RIGHT TO LEFT OF CMDTOOL) |
| START MAILTOOL | (IT GOES ICONIC IN UPPER RIGHT TO LEFT OF TEXTEDIT) |

---

<DEHAT> CONSOLE CLICK IN WINDOW FOR FOCUS <SNAPSHOT>
<DEHAT> CONSOLE LS -L
        CONSOLE GREP INCLUDE *.C
        CONSOLE CP MAILBOX.DEFAULT/VAR/SPOOL/MAIL/$USER
        CONSOLE CP -R MAILDIR.DEFAULT MAILDIR <SNAPSHOT>

---

<DEHAT> MAILTOOL OPEN WITH ICON MENU <SNAPSHOT>
<DEHAT> MAILTOOL MOVE MAIL WINDOW TO LOWER RIGHT USING MOUSE
        ACCELERATOR <SNAPSHOT>
<DEHAT> MAILTOOL NEWMAIL OR FILE/HOME
        MAILTOOL MOVE THE VIEWING WINDOW TO THE UPPER RIGHT PART OF THE
SCREEN.    DO NOT COVER THE ICONS. USE MOUSE ACCELERATOR <SNAPSHOT>
<DEHAT> MAILTOOL COMPOSE BUTTON
        MAILTOOL CLICK IN COMPOSE WINDOW TO FIELD FOR FOCUS
        MAILTOOL TYPE IN <TESTUSER> IN THE RECIPIENTS FIELD
        MAILTOOL GOTO SUBJECT FIELD
        MAILTOOL TYPE IN "TEST" IN THE SUBJECT FIELD
        MAILTOOL GOTO BODY OF MESSAGE AND CLICK FOR FOCUS
        MAILTOOL TYPE IN "THIS IS A TEST." IN BODY OF MESSAGE FIELD.
        MAILTOOL DELIVER BUTTON    <SNAPSHOT>
<DEHAT> MAILTOOL NEWMAIL OR FILE/HOME <SNAPSHOT>

---

<DEHAT> CONSOLE CLICK ON FRAME TO BRING TO TOP <SNAPSHOT>
        CONSOLE CLICK IN WINDOW FOR FOCUS
<DEHAT> CONSOLE EGREP THE TEXT.PROC.BENCH.INPUT
        CONSOLE VI USER.PS-
        CONSOLE G
        CONSOLE:%S/l/l/
        CONSOLE IG
        CONSOLE :Q! (TO EXIT FROM VI)
        CONSOLE LS -L    <SNAPSHOT>

---

<DEHAT> TEXTEDIT OPEN WITH MOUSE ACCELERATOR <SNAPSHOT>
<DEHAT> TEXTEDIT MOVE WINDOW TO LOWER LEFT OF DESKTOP, SO THAT THE CONSOLE
        IS PARTLY COVERED - USE MOUSE ACCELERATOR <SNAPSHOT>

<DEHAT> TEXTEDIT CLICK ON FILE BUTTON
        TEXTEDIT TYPE "PSU.C"
        TEXTEDIT CLICK ON LOAD FILE BUTTON <SNAPSHOT>
<DEHAT> TEXTEDIT RESIZE WINDOW - DON'T REALLY CHANGE SIZE,
        JUST LEAVE IT AS IT IS - USE MOUSE ACCELERATOR <SNAPSHOT>
<DEHAT> TEXTEDIT USE MENU TO LAYER TO BACK (BEHIND CONSOLE) <SNAPSHOT>

| | |
|---|---|
| <DEHAT> | CMDTOOL OPEN WITH MOUSE ACCELERATOR <SNAPSHOT> |
| <DEHAT> | CMDTOOL MOVE WINDOW TO UPPER RIGHT OF DESKTOP, SO THAT THE MAILTOOL IS PARTLY COVERED, BUT THE CLOCK IS NOT COVERED - USE MOUSE ACCELERATOR <SNAPSHOT> |
| <DEHAT> | CMDTOOL RESIZE WINDOW - SO THAT IT DOES NOT OVERLAP EITHER CONSOLE OR TEXTEDIT - USE MOUSE ACCELERATOR <SNAPSHOT> |
| | CMDTOOL CLICK IN WINDOW TO GET FOCUS |
| <DEHAT> | CMDTOOL CP TEXT.PROC.BENCH.INPUT FOO |
| | CMDTOOL RM FOO |
| | CMDTOOL MAIL 'WHOAMI'@'HOSTNAME' |
| | CMDTOOL TYPE "THIS IS A TEST" |
| | CMDTOOL CTLR-R (TO TERMINATE MAIL) <SNAPSHOT> |

---

| | |
|---|---|
| <DEHAT> | CONSOLE CLICK ON FRAME TO MOVE TO TOP <SNAPSHOT> |
| | CONSOLE CLICK ON WINDOW FOR FOCUS |
| <DEHAT> | CONSOLE SCROLL BACK ONE PAGE <DEHAT> |
| <DEHAT> | CONSOLE CLICK ON FIRST "L" OF "LS -L" |
| | CONSOLE USE DRAG SELECT TO SELECT "LS -L<CR>" (USING LEFT BUTTON) |
| | CONSOLE USE MENU TO COPY TEXT TO CLIPBOARD <SNAPSHOT> |

---

| | |
|---|---|
| <DEHAT> | CMDTOOL CLICK FOR FOCUS AR C-SHELL PROMPT |
| | CMDTOOL USE MENU TO PASTE "LS -L<CR>" IN WINDOW <SNAPSHOT> |

---

| | |
|---|---|
| <DEHAT> | CONSOLE USE FRAME MENU TO LAYER IT BEHIND THE TEXTEDIT WINDOW <SNAPSHOT> |

---

| | |
|---|---|
| <DEHAT> | TEXTEDIT USE TRIPLE CLICK TO SELECT THE LINE "# INCLUDE <SYS/WAIT.H> <SNAPSHOT> |
| <DEHAT> | TEXTEDIT MENU EDIT/COPY TO COPY THE SELECTION |
| | TEXTEDIT CLICK ON THE LINE BELOW "# INCLUDE <SYS/WAIT.H> |
| | TEXTEDIT MENU EDIT/PASTE TO PASTE IN THE SELECTION <SNAPSHOT> |
| <DEHAT> | TEXTEDIT FIND/FIND AND REPLACE MENU |

---

| | |
|---|---|
| <DEHAT> | FIND&REPLACE CLICK ON THE FIND FIELD |
| | FIND&REPLACE TYPE "IF" |
| | FIND&REPLACE CLICK ON REPLACE FIELD |
| | FIND&REPLACE TYPE "IF" |
| | FIND&REPLACE PRESS REPLACE ALL BUTTON |
| | FIND&REPLACE QUIT WINDOW (PRESS DONE BUTTON) <SNAPSHOT> |

---

| | |
|---|---|
| <DEHAT> | TEXTEDIT USE TRIPLE CLICK TO SELECT THE LINE "#INCLUDE <SYS/WAIT.H> |
| | TEXTEDIT MENU EDIT/CUT TO CUT THE SELECTION |
| | TEXTEDIT USE MENU FILE/SAVE CURRENT FILE TO SAVE FILE <SNAPSHOT> |

| | |
|---|---|
| \<DEHAT\> | CMDTOOL USE FRAME MENU TO REDISPLAY/ REFRESH WINDOW \<SNAPSHOT\> |
| | CMDTOOL CLICK IN WINDOW FOR FOCUS |
| \<DEHAT\> | CMDTOOL VI USER.PS- |
| | CMDTOOL CTRL-F |
| | CMDTOOL CTRL-F |
| | CMDTOOL G |
| | CMDTOOL ZZ (TO EXIT FROM VI) |
| | CMDTOOL NROFF TEXT.PROC.BENCH.INPUT > FOO |
| | CMDTOOL RM FOO \<SNAPSHOT\> |
| \<DEHAT\> | CMDTOOL USE FRAME MENU TO CLOSE TO ICON \<SNAPSHOT\> |

---

| | |
|---|---|
| \<DEHAT\> | MAILTOOL CLICK ON FRAME TO BRING TO TOP \<SNAPSHOT\> |
| \<DEHAT\> | MAILTOOL NEXT BUTTON |
| | MAILTOOL DELETE BUTTON |
| | MAILTOOL PRINT BUTTON \<SNAPSHOT\> |
| \<DEHAT\> | MAILTOOL CLICK IN FOLDER NAME FIELD |
| | MAILTOOL TYPE"PAW" INTO FOLDER NAME FIELD |
| | MAILTOOL USE MENUS (FILE->MOVE->TO//) |
| | MAILTOOL POP UP FRAME COMES UP. TYPE IN DESTINATION. \<SNAPSHOT\> |
| | MAILTOOL CLICK FOLDER BUTTON (THE FIRST MESSAGE IN THE FOLDER IS AUTOMATICALLY OPENED FOR VIEWING) |
| | MAILTOOL BRING VIEWING WINDOW TO THE TOP |
| \<DEHAT\> | MAILTOOL SELECT (FILE->OPEN FOLDER) FROM MENU |
| | MAILTOOL MOUSE TO DISPLAY SCROLLBAR |
| | MAILTOOL SCROLL DOWN ONE PANE (THIS MESSAGE IS BETWEEN 1 AND 2 PANES IN SIZE) \<SNAPSHOT\> |

---

| | |
|---|---|
| \<DEHAT\> | CONSOLE USE MOUSE ACCELERATOR TO LAYER TO TOP \<SNAPSHOT\> |
| | CONSOLE CLICK FOR FOCUS IN WINDOW |
| \<DEHAT\> | CONSOLE FGREP ECHO[HL]? |
| | CONSOLE LS -L |
| | CONSOLE CAT IO.C \<SNAPSHOT\> |
| \<DEHAT\> | CONSOLE GOTO SCROLLBAR |
| | CONSOLE SCROLL BACKWARDS 1 PANE |
| | CONSOLE SCROLL BACKWARDS 1 PANE |
| | CONSOLE SCROLL BACKWARDS 1 PANE |
| | CONSOLE SCROLL FORWORD 1 LINE |
| | CONSOLE SCROLL FORWORD 1 LINE |
| | CONSOLE SCROLL FORWORD 1 LINE |
| | CONSOLE SCROLL TO END OF TEXT \<SNAPSHOT\> |
| \<DEHAT\> | CONSOLE USE FRAME MENU TO LAYER TO BOTTOM \<SNAPSHOT\> |

---

| | |
|---|---|
| \<DEHAT\> | TEXTEDIT CLOSE WINDOW TO ICON USING MOUSE ACCELERATOR \<SNAPSHOT\> |

---

| | |
|---|---|
| \<DEHAT\> | CMDTOOL OPEN WITH MOUSE ACCELERATOR \<SNAPSHOT\> |
| | CMDTOOL CLICK IN WINDOW FOR FOCUS |
| \<DEHAT\> | CMDTOOL CAT *.C .. FOO |
| | CMDTOOL RM FOO |
| | CMDTOOL LS -L \<SNAPSHOT\> |

---

| | |
|---|---|
| | CONSOLE RM*% |
| | CONSOLE RM/VAR/SPOOL/MAIL/$USER |

---

| | |
|---|---|
| \<DEHAT\> | MAILTOOL CLICK WITH MOUSE ON FRAME TO LAYER TO FRONT \<SNAPSHOT\> |
| \<DEHAT\> | MAILTOOL DOUBLE CLICK ON LAST MESSAGE IN HEADERS |
| | MAILTOOL SELECT "QUIT" FROM FRAME MENU \<SNAPSHOT\> VIEWING WINDOW |
| \<DEHAT\> | SELECT ALL TOOLS THEN QUIT \<SNAPSHOT\> |

Fig 5

```
NeWS_Journal_File 1.0
0 884 16 null /MoveTo
0.027 454 577 null /MouseDragged
0.035 452 573 null /MouseDragged
0.036 452 563 null /MouseDragged
0.037 454 555 null /MouseDragged
0.037 458 541 null /MouseDragged
0.038 462 523 null /MouseDragged
0.038 464 509 null /MouseDragged
0.039 466 499 null /MouseDragged
0.04 466 495 null /MouseDragged
0.04 466 491 null /MouseDragged
0.041 466 487 null /MouseDragged
0.042 466 485 null /MouseDragged                    ──400
w /F3_done
0.095 466 485 /DownTransition /RightMouseButton ──410
s /GetKeyState
0.153 464 465 null /MouseDragged ──415
0.154 464 463 null /MouseDragged
0.159 464 463 /UpTransition /RightMouseButton
s /SubUnviewableNotify /UnviewableNotify /UnmapNotify /DoItEvent /DoItEvent
0.162 464 464 null /MouseDragged ──420
w /F4_done
0.213 463 463 null /MouseDragged   430
0.214 465 463 null /MouseDragged          ──425
0.215 465 461 null /MouseDragged
0.219 462 457 null /MouseDragged
0.22 462 451 null /MouseDragged
0.221 464 443 null /MouseDragged
0.222 464 427 null /MouseDragged
0.222 462 403 null /MouseDragged
0.223 460 375 null /MouseDragged
0.223 458 349 null /MouseDragged
0.224 460 337 null /MouseDragged
w /F3_done
0.237 460 337 /DownTransition /RightMouseButton
s /GetKeyState
0.252 460 339 null /MouseDragged
0.253 460 347 null /MouseDragged
0.255 464 395 null /MouseDragged
0.256 464 413 null /MouseDragged
0.258 461 438 null /MouseDragged
0.276 455 438 null /MouseDragged
0.278 405 448 null /MouseDragged
0.282 397 450 null /MouseDragged
0.283 395 450 null /MouseDragged
0.284 395 452 null /MouseDragged
0.293 395 452 /UpTransition /RightMouseButton
s /DoItEvent /UnmapNotify /DoItEvent /SubUnviewableNotify /UnviewableNotify
0.294 396 451 null /MouseDragged
s [/ClientMessage 1]
s [/ClientMessage 1]
s /X11-GetInputFocus
w /F4_done
0.681 395 451 null /MouseDragged
0.683 391 449 null /MouseDragged
0.683 385 439 null /MouseDragged
0.684 377 419 null /MouseDragged
0.685 371 399 null /MouseDragged
0.685 365 377 null /MouseDragged
0.686 363 357 null /MouseDragged
0.687 363 345 null /MouseDragged
0.687 363 341 null /MouseDragged
0.688 363 333 null /MouseDragged
0.689 365 321 null /MouseDragged
0.69 367 315 null /MouseDragged
```

Figure 6

```
0.69  369 311 null /MouseDragged
0.692 369 309 null /MouseDragged
0.692 369 307 null /MouseDragged
0.693 371 307 null /MouseDragged
w  /F3_done
0.711 371 309 null /MouseDragged
0.712 373 311 null /MouseDragged
0.713 375 315 null /MouseDragged
0.714 377 317 null /MouseDragged
0.714 377 319 null /MouseDragged
0.715 377 319 /DownTransition /RightMouseButton
s  /GetKeyState
0.732 377 322 null /MouseDragged
0.733 377 330 null /MouseDragged
0.738 385 420 null /MouseDragged
0.739 387 446 null /MouseDragged
0.746 386 445 null /MouseDragged
0.75  382 445 null /MouseDragged
0.75  376 447 null /MouseDragged
0.751 370 451 null /MouseDragged
0.752 342 455 null /MouseDragged
0.762 342 455 /UpTransition /RightMouseButton
s  /DoItEvent /UnmapNotify /DoItEvent /SubUnviewableNotify /UnviewableNotify
0.774 348 458 null /MouseDragged
0.784 336 491 null /MouseDragged
0.787 334 511 null /MouseDragged
0.788 328 559 null /MouseDragged
0.789 328 569 null /MouseDragged
0.79  326 589 null /MouseDragged
s  [/ClientMessage 1]
s  [/ClientMessage 1]
s  /X11-GetInputFocus
w  /F4_done
1.    326 591 null /MouseDragged
1.001 326 593 null /MouseDragged
1.003 326 575 null /MouseDragged
1.004 332 539 null /MouseDragged
1.004 338 503 null /MouseDragged
1.005 350 465 null /MouseDragged
1.006 372 425 null /MouseDragged
1.006 394 389 null /MouseDragged
1.007 442 335 null /MouseDragged
1.008 468 315 null /MouseDragged
1.009 494 297 null /MouseDragged
1.01  522 279 null /MouseDragged
1.01  544 257 null /MouseDragged
1.011 564 237 null /MouseDragged
1.012 578 225 null /MouseDragged
1.012 586 215 null /MouseDragged
1.013 588 211 null /MouseDragged
1.02  591 201 null /MouseDragged
1.021 607 187 null /MouseDragged
1.022 655 155 null /MouseDragged
1.022 665 149 null /MouseDragged
1.023 665 147 null /MouseDragged
w  /F3_done
1.035 667 146 null /MouseDragged
1.036 675 142 null /MouseDragged
1.036 685 136 null /MouseDragged
1.037 691 132 null /MouseDragged
1.038 699 128 null /MouseDragged
1.039 707 122 null /MouseDragged
1.039 717 114 null /MouseDragged
1.04  727 106 null /MouseDragged
1.04  739 96  null /MouseDragged
1.041 747 90  null /MouseDragged
```

Figure 6

```
1.042 755 84 null /MouseDragged
1.042 759 80 null /MouseDragged
1.043 763 78 null /MouseDragged
1.044 765 76 null /MouseDragged
1.045 767 74 null /MouseDragged
1.045 771 74 null /MouseDragged
1.046 773 72 null /MouseDragged
1.047 777 72 null /MouseDragged
1.047 779 72 null /MouseDragged
1.048 781 72 null /MouseDragged
1.049 783 70 null /MouseDragged
1.055 785 70 null /MouseDragged
1.056 785 72 null /MouseDragged
1.057 787 72 null /MouseDragged
1.064 787 72 /DownTransition /LeftMouseButton
1.064 787 72 /UpTransition /LeftMouseButton
a /SubUnviewableNotify /UnviewableNotify /SubUnviewableNotify /UnviewableNotify
1.116 784 73 null /MouseDragged
1.116 784 73 /DownTransition /LeftMouseButton
1.124 772 651 null /MouseDragged
1.125 776 677 null /MouseDragged
1.127 794 735 null /MouseDragged
1.128 804 757 null /MouseDragged
1.129 814 781 null /MouseDragged
1.129 814 793 null /MouseDragged
1.13 814 807 null /MouseDragged
1.131 814 827 null /MouseDragged
1.132 816 861 null /MouseDragged
1.133 820 875 null /MouseDragged
1.133 824 891 null /MouseDragged
1.134 830 903 null /MouseDragged
1.135 832 915 null /MouseDragged
1.136 840 947 null /MouseDragged
1.137 842 965 null /MouseDragged
1.138 846 989 null /MouseDragged
1.139 848 997 null /MouseDragged
1.139 850 1005 null /MouseDragged
1.14 852 1013 null /MouseDragged
1.141 852 1019 null /MouseDragged
1.142 852 1021 null /MouseDragged
1.147 852 1021 /UpTransition /LeftMouseButton
1.155 848 1017 null /MouseDragged
1.156 836 1007 null /MouseDragged
1.156 816 991 null /MouseDragged
1.157 796 977 null /MouseDragged
1.158 782 965 null /MouseDragged
1.158 764 949 null /MouseDragged
1.159 750 935 null /MouseDragged
1.16 740 925 null /MouseDragged
w /F4_done
1.193 737 924 null /MouseDragged
1.193 721 916 null /MouseDragged
1.194 695 906 null /MouseDragged
1.195 631 866 null /MouseDragged
1.196 595 846 null /MouseDragged
1.197 555 820 null /MouseDragged
1.197 511 790 null /MouseDragged
1.198 469 760 null /MouseDragged
1.198 429 732 null /MouseDragged
1.199 397 698 null /MouseDragged
1.2 391 674 null /MouseDragged
1.206 390 670 null /MouseDragged
1.207 386 636 null /MouseDragged
1.208 388 604 null /MouseDragged
1.208 384 570 null /MouseDragged
1.209 380 536 null /MouseDragged
```

3 of 9      Figure 6

```
1.209 380 502 null /MouseDragged
1.21 378 474 null /MouseDragged
1.211 380 442 null /MouseDragged
1.212 380 410 null /MouseDragged
1.212 382 370 null /MouseDragged
1.213 384 334 null /MouseDragged
1.213 384 312 null /MouseDragged
1.214 386 306 null /MouseDragged
w /F3_done
1.229 386 306 /DownTransition /RightMouseButton
s /GetKeyState
1.246 388 315 null /MouseDragged
1.248 390 355 null /MouseDragged
1.249 390 379 null /MouseDragged
1.251 392 389 null /MouseDragged
1.26 390 390 null /MouseDragged
1.261 382 394 null /MouseDragged
1.262 326 408 null /MouseDragged
1.266 300 416 null /MouseDragged
1.269 278 420 null /MouseDragged
1.27 272 420 null /MouseDragged
1.271 272 422 null /MouseDragged
1.272 270 422 null /MouseDragged
1.273 268 424 null /MouseDragged
1.281 268 424 /UpTransition /RightMouseButton
s [/ClientMessage 1]
s /X11-GetInputFocus
w /F4_done
1.516 295 406 null /MouseDragged
1.516 329 384 null /MouseDragged
1.517 367 362 null /MouseDragged
1.518 407 344 null /MouseDragged
1.518 475 310 null /MouseDragged
1.519 501 292 null /MouseDragged
1.52 521 278 null /MouseDragged
1.521 535 266 null /MouseDragged
1.522 545 256 null /MouseDragged
1.522 551 250 null /MouseDragged
1.525 551 252 null /MouseDragged
1.526 549 244 null /MouseDragged
1.526 549 242 null /MouseDragged
1.533 548 224 null /MouseDragged
1.534 554 202 null /MouseDragged
1.534 566 176 null /MouseDragged
1.535 574 162 null /MouseDragged
1.536 578 156 null /MouseDragged
1.537 582 152 null /MouseDragged
1.537 588 150 null /MouseDragged
1.538 590 148 null /MouseDragged
1.538 592 146 null /MouseDragged
w /F3_done
1.544 595 142 null /MouseDragged
1.544 609 132 null /MouseDragged
1.545 625 124 null /MouseDragged
1.546 643 114 null /MouseDragged
1.547 657 104 null /MouseDragged
1.547 671 96 null /MouseDragged
1.548 681 88 null /MouseDragged
1.548 691 82 null /MouseDragged
1.549 699 74 null /MouseDragged
1.55 711 64 null /MouseDragged
1.551 721 56 null /MouseDragged
1.551 745 44 null /MouseDragged
1.553 751 44 null /MouseDragged
1.554 755 44 null /MouseDragged
1.554 759 46 null /MouseDragged
```

Figure 6

```
1.555 763 46 null /MouseDragged
1.556 767 46 null /MouseDragged
1.556 769 44 null /MouseDragged
1.557 771 44 null /MouseDragged
1.558 775 44 null /MouseDragged
1.558 777 44 null /MouseDragged
1.559 779 42 null /MouseDragged
1.56 781 42 null /MouseDragged
1.561 783 42 null /MouseDragged
1.563 783 40 null /MouseDragged
1.568 784 40 null /MouseDragged
1.569 784 42 null /MouseDragged
1.57 786 42 null /MouseDragged
1.578 786 42 /DownTransition /LeftMouseButton
1.579 786 42 /UpTransition /LeftMouseButton
  /SubUnviewableNotify /UnviewableNotify /SubUnviewableNotify /UnviewableNotify
1.636 781 52 null /MouseDragged
1.636 773 76 null /MouseDragged
1.637 767 108 null /MouseDragged
1.638 755 188 null /MouseDragged
1.639 749 238 null /MouseDragged
1.639 745 292 null /MouseDragged
1.64 741 348 null /MouseDragged
1.641 737 404 null /MouseDragged
1.642 733 456 null /MouseDragged
1.642 727 506 null /MouseDragged
1.643 723 548 null /MouseDragged
1.643 719 584 null /MouseDragged
1.644 719 616 null /MouseDragged
1.645 719 640 null /MouseDragged
1.646 717 678 null /MouseDragged
1.647 715 688 null /MouseDragged
1.647 715 692 null /MouseDragged
1.648 713 698 null /MouseDragged
1.649 713 704 null /MouseDragged
1.649 713 712 null /MouseDragged
1.65 713 716 null /MouseDragged
1.66 713 716 /DownTransition /LeftMouseButton
  /AcceptFocus /DeSelect /SetSelectionAt
1.661 713 716 /UpTransition /LeftMouseButton
1.666 706 631 null /MouseDragged
1.667 778 125 null /MouseDragged
1.683 758 33 null /MouseDragged
1.691 758 34 null /MouseDragged
1.692 760 34 null /MouseDragged
1.693 762 34 null /MouseDragged
1.693 764 34 null /MouseDragged
1.696 764 36 null /MouseDragged
1.697 764 36 /DownTransition /LeftMouseButton
1.698 764 104 null /MouseDragged
1.7 756 230 null /MouseDragged
1.7 754 306 null /MouseDragged
1.701 748 386 null /MouseDragged
1.701 740 470 null /MouseDragged
1.703 718 646 null /MouseDragged
1.703 708 738 null /MouseDragged
1.704 696 826 null /MouseDragged
1.705 678 966 null /MouseDragged
1.706 672 1012 null /MouseDragged
1.707 670 1044 null /MouseDragged
1.708 672 1066 null /MouseDragged
1.71 676 1062 null /MouseDragged
1.71 680 1052 null /MouseDragged
1.711 688 1038 null /MouseDragged
1.711 692 1032 null /MouseDragged
1.712 694 1030 null /MouseDragged
```

Figure 6

```
1.714 706 1028 null /MouseDragged
1.714 712 1028 null /MouseDragged
1.715 714 1026 null /MouseDragged
1.716 716 1024 null /MouseDragged
1.717 718 1022 null /MouseDragged
1.718 720 1018 null /MouseDragged
1.718 722 1018 null /MouseDragged
1.719 724 1018 null /MouseDragged
1.721 726 1018 null /MouseDragged
1.722 728 1016 null /MouseDragged
1.723 730 1016 null /MouseDragged
1.724 734 1014 null /MouseDragged
1.725 736 1014 null /MouseDragged
1.731 736 1014 /UpTransition /LeftMouseButton
1.736 721 985 null /MouseDragged
1.738 699 947 null /MouseDragged
1.738 693 931 null /MouseDragged
1.739 689 927 null /MouseDragged
1.74 689 925 null /MouseDragged
1.743 689 926 null /MouseDragged
1.761 689 925 null /MouseDragged
1.764 689 925 /DownTransition /LeftMouseButton
s /DeSelect /SetSelectionAt
1.766 689 925 /UpTransition /LeftMouseButton
w /F4_done
1.791 661 908 null /MouseDragged
1.792 623 878 null /MouseDragged
1.792 585 846 null /MouseDragged
1.793 545 806 null /MouseDragged
1.794 507 770 null /MouseDragged
1.794 475 730 null /MouseDragged
1.795 451 684 null /MouseDragged
1.796 429 636 null /MouseDragged
1.796 409 582 null /MouseDragged
1.797 403 526 null /MouseDragged
1.797 405 516 null /MouseDragged
1.804 397 489 null /MouseDragged
1.805 391 447 null /MouseDragged
1.805 385 405 null /MouseDragged
1.806 381 369 null /MouseDragged
1.807 381 347 null /MouseDragged
1.807 381 343 null /MouseDragged
w /F3_done
1.825 381 343 /DownTransition /RightMouseButton
s /GetKeyState
1.839 381 345 null /MouseDragged
1.84 381 355 null /MouseDragged
1.841 383 377 null /MouseDragged
1.842 381 391 null /MouseDragged
1.843 381 415 null /MouseDragged
1.844 381 427 null /MouseDragged
1.858 352 438 null /MouseDragged
1.861 320 446 null /MouseDragged
1.863 294 452 null /MouseDragged
1.865 268 456 null /MouseDragged
1.868 258 458 null /MouseDragged
1.868 256 458 null /MouseDragged
1.869 252 460 null /MouseDragged
1.87 250 460 null /MouseDragged
1.871 246 460 null /MouseDragged
1.883 245 461 null /MouseDragged
1.883 241 463 null /MouseDragged
1.884 239 463 null /MouseDragged
1.892 239 463 /UpTransition /RightMouseButton
s /DoItEvent /UnmapNotify /DoItEvent /SubUnviewableNotify /UnviewableNotify
1.901 238 469 null /MouseDragged
```

Figure 6

```
1.912 240 471 null /MouseDragged
s  [/ClientMessage 1]
s  /X11-GetInputFocus
2.509 249 475 null /MouseDragged
2.51 261 483 null /MouseDragged
2.511 279 493 null /MouseDragged
2.511 301 505 null /MouseDragged
2.512 319 519 null /MouseDragged
2.513 339 535 null /MouseDragged
2.513 361 553 null /MouseDragged
2.514 383 569 null /MouseDragged
2.515 401 585 null /MouseDragged
2.515 419 599 null /MouseDragged
2.516 433 613 null /MouseDragged
2.517 447 625 null /MouseDragged
2.517 463 639 null /MouseDragged
2.518 479 653 null /MouseDragged
2.519 501 669 null /MouseDragged
2.519 525 685 null /MouseDragged
2.52 551 701 null /MouseDragged
2.521 581 715 null /MouseDragged
2.521 609 727 null /MouseDragged
2.522 635 737 null /MouseDragged
2.523 661 745 null /MouseDragged
2.523 685 751 null /MouseDragged
2.524 703 757 null /MouseDragged
2.526 727 761 null /MouseDragged
2.547 726 761 null /MouseDragged
2.548 724 759 null /MouseDragged
2.548 720 759 null /MouseDragged
2.549 718 759 null /MouseDragged
2.55 712 759 null /MouseDragged
2.551 704 757 null /MouseDragged
2.551 690 755 null /MouseDragged
2.552 676 753 null /MouseDragged
2.553 648 747 null /MouseDragged
2.554 636 745 null /MouseDragged
2.555 630 743 null /MouseDragged
w /F4_done
2.599 628 745 null /MouseDragged
2.599 624 747 null /MouseDragged
2.6 628 753 null /MouseDragged
2.601 628 759 null /MouseDragged
2.605 616 752 null /MouseDragged
2.606 598 744 null /MouseDragged
2.607 568 736 null /MouseDragged
2.607 526 726 null /MouseDragged
2.608 468 708 null /MouseDragged
2.609 412 682 null /MouseDragged
2.609 368 648 null /MouseDragged
2.61 342 602 null /MouseDragged
2.61 328 552 null /MouseDragged
2.611 318 502 null /MouseDragged
2.612 316 454 null /MouseDragged
2.613 320 416 null /MouseDragged
2.613 324 390 null /MouseDragged
2.614 328 376 null /MouseDragged
2.614 330 372 null /MouseDragged
w /F3_done
2.625 336 364 null /MouseDragged
2.626 352 338 null /MouseDragged
2.626 374 308 null /MouseDragged
2.627 406 280 null /MouseDragged
2.628 444 248 null /MouseDragged
2.628 484 218 null /MouseDragged
2.631 594 142 null /MouseDragged
```

Figure 6

```
2.638 603 134 null /MouseDragged
2.639 623 120 null /MouseDragged
2.639 649 104 null /MouseDragged
2.64 677 90 null /MouseDragged
2.64 703 78 null /MouseDragged
2.641 781 48 null /MouseDragged
2.644 789 44 null /MouseDragged
2.645 795 42 null /MouseDragged
2.646 801 40 null /MouseDragged
2.646 809 38 null /MouseDragged
2.647 817 36 null /MouseDragged
2.648 841 28 null /MouseDragged
2.65 851 24 null /MouseDragged
2.65 861 22 null /MouseDragged
2.651 867 20 null /MouseDragged
2.652 873 20 null /MouseDragged
2.652 879 18 null /MouseDragged
2.653 883 16 null /MouseDragged
2.654 885 16 null /MouseDragged
2.655 887 16 null /MouseDragged
2.656 889 16 null /MouseDragged
2.657 887 18 null /MouseDragged
2.659 887 20 null /MouseDragged
2.661 887 22 null /MouseDragged
2.67 887 22 /DownTransition /LeftMouseButton
2.67 887 22 /UpTransition /LeftMouseButton
s   /SubUnviewableNotify /UnviewableNotify /SubUnviewableNotify /UnviewableNotify
2.742 881 22 null /MouseDragged
2.743 875 22 null /MouseDragged
2.743 871 22 null /MouseDragged
2.754 871 22 /DownTransition /LeftMouseButton
2.756 846 83 null /MouseDragged
2.757 830 125 null /MouseDragged
2.758 802 235 null /MouseDragged
2.76 774 371 null /MouseDragged
2.76 758 453 null /MouseDragged
2.761 742 533 null /MouseDragged
2.762 714 667 null /MouseDragged
2.764 706 725 null /MouseDragged
2.764 706 727 null /MouseDragged
2.769 709 735 null /MouseDragged
2.77 709 733 null /MouseDragged
2.776 701 747 null /MouseDragged
2.777 685 775 null /MouseDragged
2.778 671 807 null /MouseDragged
2.779 651 873 null /MouseDragged
2.78 651 945 null /MouseDragged
2.781 653 973 null /MouseDragged
2.782 657 1005 null /MouseDragged
2.783 655 1017 null /MouseDragged
2.784 655 1029 null /MouseDragged
2.785 655 1035 null /MouseDragged
2.787 655 1033 null /MouseDragged
2.789 653 1033 null /MouseDragged
2.791 653 1031 null /MouseDragged
2.792 653 1027 null /MouseDragged
2.793 651 1025 null /MouseDragged
2.794 651 1023 null /MouseDragged
2.8 651 1023 /UpTransition /LeftMouseButton
2.8 651 1022 null /MouseDragged
2.805 613 926 null /MouseDragged
2.821 613 926 /DownTransition /LeftMouseButton
s   /DeSelect /SetSelectionAt
2.822 613 926 /UpTransition /LeftMouseButton
w  /F4_done
2.863 599 918 null /MouseDragged
```

Figure 6

```
2.864 569 902 null /MouseDragged
2.864 539 888 null /MouseDragged
2.865 505 864 null /MouseDragged
2.866 471 826 null /MouseDragged
2.867 435 778 null /MouseDragged
2.867 407 720 null /MouseDragged
2.868 383 666 null /MouseDragged
2.868 369 614 null /MouseDragged
2.869 371 576 null /MouseDragged
2.876 362 566 null /MouseDragged
2.877 352 550 null /MouseDragged
2.877 342 538 null /MouseDragged
2.878 332 520 null /MouseDragged
2.878 326 498 null /MouseDragged
2.879 322 474 null /MouseDragged
2.88 322 454 null /MouseDragged
2.881 320 444 null /MouseDragged
w /F3_done
2.908 324 443 null /MouseDragged
2.909 334 439 null /MouseDragged
2.91 352 433 null /MouseDragged
2.91 376 423 null /MouseDragged
2.911 414 417 null /MouseDragged
2.912 456 411 null /MouseDragged
2.912 500 403 null /MouseDragged
2.913 572 389 null /MouseDragged
2.914 606 383 null /MouseDragged
2.915 644 375 null /MouseDragged
2.916 684 367 null /MouseDragged
2.916 720 361 null /MouseDragged
2.917 750 357 null /MouseDragged
2.917 774 355 null /MouseDragged
2.918 786 353 null /MouseDragged
2.919 790 353 null /MouseDragged
2.924 790 353 /DownTransition /LeftMouseButton
2.924 790 353 /UpTransition /LeftMouseButton
s  [/ClientMessage 1]
s  /X11-GetInputFocus
w /F4_done
3.021 788 357 null /MouseDragged
3.022 780 361 null /MouseDragged
3.023 770 371 null /MouseDragged
3.023 756 383 null /MouseDragged
3.024 738 395 null /MouseDragged
3.025 726 405 null /MouseDragged
3.025 722 407 null /MouseDragged
3.027 724 407 null /MouseDragged
w /F3_done
3.093 724 407 /DownTransition 28501
3.094 724 407 /UpTransition 28501
3.103 724 407 /DownTransition 28494
3.104 724 407 /UpTransition 28494
3.112 724 407 /DownTransition 28537
3.114 724 407 /UpTransition 28537
3.124 724 407 /DownTransition 28456
3.125 724 407 /UpTransition 28456
3.127 724 407 /DownTransition 28501
3.129 724 407 /UpTransition 28501
3.141 724 407 /DownTransition 28505
3.141 724 407 /UpTransition 28505
s  [/ClientMessage 1]
s  /X11-GetInputFocus
3.325 724 407 /DownTransition 28497
3.326 724 407 /UpTransition 28497
3.334 724 407 /DownTransition 28473
3.335 724 407 /UpTransition 28473
```

Figure 6

```
textedit
pid: 2244  priv: 33/ 33/  0  shar:155/138/  0  dev:  0/  0/  0  tot:188/171/  0
       0: .er.............  xxxxxxxxxxxxxxx. ................ ................
  ec00000: ................ ................ ....rrrrrrrrrrrr rrrrrrrr++rrrrr+
  ec80000: rrrrrr.......... ....xx..rrrrrrr  rrrrrr.xx++..rr  ++++++++++rr..x.
  ed00000: .rrrrrrrrrrrr+r  rrrrrrrrrrrrrrrr rr+rrrrrrrrrrrrr rrrrrrrrrrrrrrrr
  ed80000: rrrrrrrrrrrrrrr  rr.............. .xxwwxxxxx..rr.  ..........a..a..x..
  ee00000: xx.............. ................ ................ ................
  ef80000: ................ ................ ................ ..............xx mailtool
pid: 2246  priv: 47/ 47/ 35  shar:166/148/ 87  dev:  0/  0/  0  tot:213/195/122
       0: .RRRRrrrrRRRR... XxXXXxxxxxXxXXXx XXXXXXXXXXXXxxX+. ................
  ec00000: ................ ................ ....RRRrrrrrrrrr rrrrrrrr++rrrrr+
  ec80000: rrrrrr.......... ....XX..RRRRRRRR rRrRRRR.Xx++..rr ++++++++++RR..X.
  ed00000: .RRRRRRRrRRRR+R  RRRRRRRRrrrrrRRR rR+RRRRRRRRrRRrrR RRrrrRRRRRRrrrrr
  ed80000: rrRRRRRRRRRRRRRR RR.............. .XXwwwXXXXX..RR. ...........a..X..
  ee00000: XX.............. ................ ................ ................
  ef80000: ................ ................ ................ ..............xX cmdtool
pid: 2238  priv: 37/ 37/ 30  shar:154/137/ 65  dev:  0/  0/  0  tot:191/174/ 95
       0: .R.............. XXXxXXXXXXXXXXXxX XxxX............. ................
  ec00000: ................ ................ ....RRrrrrrrrrrr rrrrrrrr++rrrrR+
  ec80000: rrrrrr.......... ....XX..RRRRrrRR rrrrrrr.Xx++..rr ++++++++++rr..x.
  ed00000: .RRrRRRRRrRRRR+R RRRRRRrRRRrrrrrr rr+rrrrrRRrRRRRR RrrrrRRRRrRrrrRR
  ed80000: RRRRRRRRRRRRRRRR Rr.............. .XXwwwXXXXX..RR. ...........a..X..
  ee00000: XX.............. ................ ................ ................
  ef80000: ................ ................ ................ ..............xX cmdtool
pid: 2241  priv: 38/ 38/  0  shar:154/137/  0  dev:  0/  0/  0  tot:192/175/  0
       0: .r.............. xxxxxxxxxxxxxxxx xxxxx........... ................
  ec00000: ................ ................ ....rrrrrrrrrrrr rrrrrrrr++rrrrr+
  ec80000: rrrrrr.......... ....xx..rrrrrrr  rrrrrr.xx++..rr  ++++++++++rr..x.
  ed00000: .rrrrrrrrrrrr+r  rrrrrrrrrrrrrrrr rr+rrrrrrrrrrrrr rrrrrrrrrrrrrrrr
  ed80000: rrrrrrrrrrrrrrr  rr.............. .xxwwxxxxx..rr.  ...........a..X..
  ee00000: xx.............. ................ ................ ................
  ef80000: ................ ................ ................ ..............xx
```

Figure 7

METHOD AND APPARATUS FOR BENCHMARKING THE WORKING SET OF WINDOW-BASED COMPUTER SYSTEMS

BACKGROUND OF THE INVENTION

1. Field of the Invention

The system of the present invention is related to the field of benchmarking of computer systems and computer software. Specifically the system of the present invention relates to the field of benchmarking of window based systems.

2. Related Applications

This application is related to copending U.S. patent application Ser. No. 07/498,206, filed Mar. 23, 1990, entitled "Synchronized Journaling System", and U.S. patent application Ser. No. 07/411,036, filed Sept. 21, 1989, entitled, "Method and Apparatus for Extracting Process Performance Information from a Network" and are herein incorporated by reference.

3. Art Background

The term "benchmarking" is used to describe a series of tests performed on a computer system which simulate various operations that may be performed by a user of the system. During the execution of tests, various measurements are taken. These tests are performed on the system a number of times and the results of the measurement taken are compared with optimum or other results recorded during benchmarking of similar systems.

Through the use of benchmarking, a systematic method is provided to test and measure the performance of systems in a controlled manner. With the advent of window based systems such as those manufactured by Sun Microsystems, Inc., Mountain View, Calif., it has become necessary to provide a means of testing the performance capability of such window systems and the computer software and hardware that implement the window systems. An example of early benchmarking of window systems is described in Gaylin, "How Are Windows Used? Some Notes on Creating An Empirically Based Windowing Benchmark Task", *CHI Proceedings* (April 1986), pages 96 to 100.

Window systems present additional factors which must be considered in evaluating system performance. For example, a distributed window system consists of multiple processes, including the application or client processes, the window server and optionally a window manager. The application processes are really client processes which are operated through the window system. The window server controls the display and mediates access to display by the client's process. It also provides a base functionality in terms of windows and cursors and determines how to draw into these windows and how to distribute events to them. Examples of window systems include the X11 ™ (X11 is a trademark of the Massachusetts Institute of Technology) which supports the X11 protocol (See Sheifler, Gettys, "The X Windows System", *ACM Transactions On Graphics*, Vol. 5, No. 2 (April 1986) pp. 79-109) and X11/NeWS system, available from Sun Microsystems, Inc., Mountain View, Calif., which supports both the X11 and NeWS ™ window server protocols (NeWS is a trademark of Sun Microsystems, Inc.) (See Shaufler, "X11/NeWS Design Overview, *Proceedings of the Summer 1988 User Conference*, (1988) pp. 23-35).

The client process is typically linked with a "toolkit" which implements the user interface functionality and provides the means for the client process to tailor the user interface to the client process. The toolkit determines how the window systems menus look, how users interact with control areas and how control areas are organized. Furthermore, the toolkit provides a programmatic interface that allows developers of the application programs to implement sophisticated windowing applications. An example of a toolkit is the XView ™ toolkit (XView is a trademark of Sun Microsystems, Inc.) available from Sun Microsystems, Inc., for the X11NeWs Window System. For further information, see Jacobs, "The XView Toolkit, An Architectural Overview", *3rd Annual Technical Conference*, (1989).

The window manager may be a separate process as is typically the case with the X11 protocol or it may be part of a window server as is the case with respect to the X11/NeWS window system where the window manager is a collection of processes that reside in the window server. The window manager controls the workspace, the window that occupies the entire screen and determines the workspace menu window and icon placement.

In a kernel-based window system, the kernel is modified to include an event manager and a means to contain window state information. This portion of the system is in charge of the input/output devices and of distributing events to application processes. The kernel-based window system also consists of a user interface toolkit which provides the applications' menus, control areas and drawing capabilities. An example of a kernel-based window system is the SunView ™ window system (SunView is a trademark of Sun Microsystems, Inc., see Sun Microsystems Inc., *SunView 1 Programmer's Guide*, revision A, (5/9/88) and Sun Microsystems, Inc., *SunView 1 Systems Programmer's Guide*, revision A, (5/9/88)).

In order to provide an accurate benchmark of the system, it is desirable to simulate as closely as possible a user session in which the user performs a variety of tasks on the system. A technique was developed to provide this type of benchmark referred to as journaling. Journaling is a method for recording events reflective of a series of user actions in a session file referred to as a "journal file". The file is subsequently read and the actions initiated and executed in the sequence recorded in the file, thereby providing an automated means for simulating the user session (See, e.g., CAPBAK/UNIX *Terminal Session Capture and Playback for UNIX Systems*, Software Research Incorporated, (1989)).

Window based systems introduce additional actions to consider when developing a benchmark for the system. A window based system consists of a number of input devices used concurrently and number of processes which interact with one another in a pre-determined sequence in order to produce the desired effect, such as selecting a client or application process from a menu or moving the cursor from one window to another. In an attempt to maintain the proper sequence of execution, a time delay between various actions is recorded in the journal file in addition to the other information recorded to simulate a user session. By scaling the time between events, it is possible to propagate events through the system faster on playback than on record. However, playing events faster than the speed at which they were initially recorded can lead to unexpected behavior. This unexpected behavior arises because of race conditions caused by one process executing prior to the uncompleted execution of another process, the final state of which is utilized by the subsequent process.

A method was developed using special events marking the locations in the journal file where previously initiated processing must be completed before initiating a subsequent process. These special events are referred to as synchronization events and are typically defined at locations where multiple processes are exchanging state. These synchronization events are put into the journal sessions during the recording phase. On playback, the journaling mechanism waits for each of these synchronization events to occur before proceeding through the journal file and initiating subsequent events in the window system. (See Islam, Ingoglia, "Testing Window Systems", *Interfaces, Systems and People Working Together*, 28th Annual Technical Symposium, ACM, Washington, D.C. (1989) pp. 95-103; and copending U.S. patent application Ser. No. 07/498,206, filed Mar. 23, 1990, entitled "Synchronized Journaling System").

There are a variety of parameters or metrics employed to measure the performance of a computer system, such as the speed of execution of a process and the output generated during execution of a process. Another metric used to measure the performance of a computer system is the measurement of the size of the working set of a process. The working set is the number of memory pages referenced during execution of a process. The working set size is indicative of the processing speed because the more pages referenced, the greater occurrence of paging. Paging is a time consuming process in which a page of information is swapped into and/or out of fast memory.

The working set is measured at predetermined time intervals and the working set size is compared to measurements taken at prior intervals to determine the performance of the system. One such system is described in copending U.S. patent application Ser. No. 07/411,036, filed Sept. 21, 1989, entitled "Method and Apparatus for Extracting Process Performance Information From a Network". Time-dependent measurements (i.e., measurements performed during predetermined time intervals) perform adequately in traditional non-window-based systems because the execution sequence is primarily controlled by the system providing a predictable temporal system in which the time based measurements can be set to measure the system performance during different portions of process execution.

However, in window-based systems, the system is user interactive and event driven. Thus, the system no longer executes in a manner that is time predictable and time-based measurements do not always occur in predictable portions of process execution. In addition, some window systems, such as X11/NeWS, include shared libraries which are jointly referenced by multiple processes. In window systems which employ shared libraries, it is also preferred that the performance on the system relevant to usage of shared libraries is measured.

SUMMARY OF THE INVENTION

It is the object of the present invention to provide an improved mechanism to benchmark window-based systems.

It is an object of the present invention to provide a benchmark mechanism to operate in an event-driven system.

It is therefore an object of the present invention to provide the performance measurement of window based systems which employ shared libraries between client processes.

It is a further an object of the present invention to provide a system for benchmarking window systems which operate in a distributed environment.

In the system of the present invention, a means for measuring the performance of event-driven systems, particularly distributed window systems which employ shared libraries, is provided. Synchronization events are preset in a journal file which, during playback of the same, trigger a paging analysis tool to read the page table of the current application processes. Once playback is complete, the page table measurements taken during playback are reviewed and information is extracted which is used to determine the working set for private memory and shared libraries. Using the working set, the number of pages referenced and the rate of reference can be used to improve performance and predict the performance behavior of a system.

BRIEF DESCRIPTION OF THE DRAWINGS

The objects, features, and advantages of the present invention will be apparent from the following description of the invention in which:

FIG. 4 is an illustrative script demonstrative of a user session.

FIG. 5 is an illustrative script demonstrative of a user session which includes synchronization events and events used to copy and clear the page tables.

FIG. 6 is an ASCII text version of a journal file including synchronization events and events to copy and clear the page tables.

FIG. 7 illustrates page tables read and stored in a file.

DETAILED DESCRIPTION OF THE INVENTION

Notation And Nomenclature

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

General System Configuration

Figure 1:
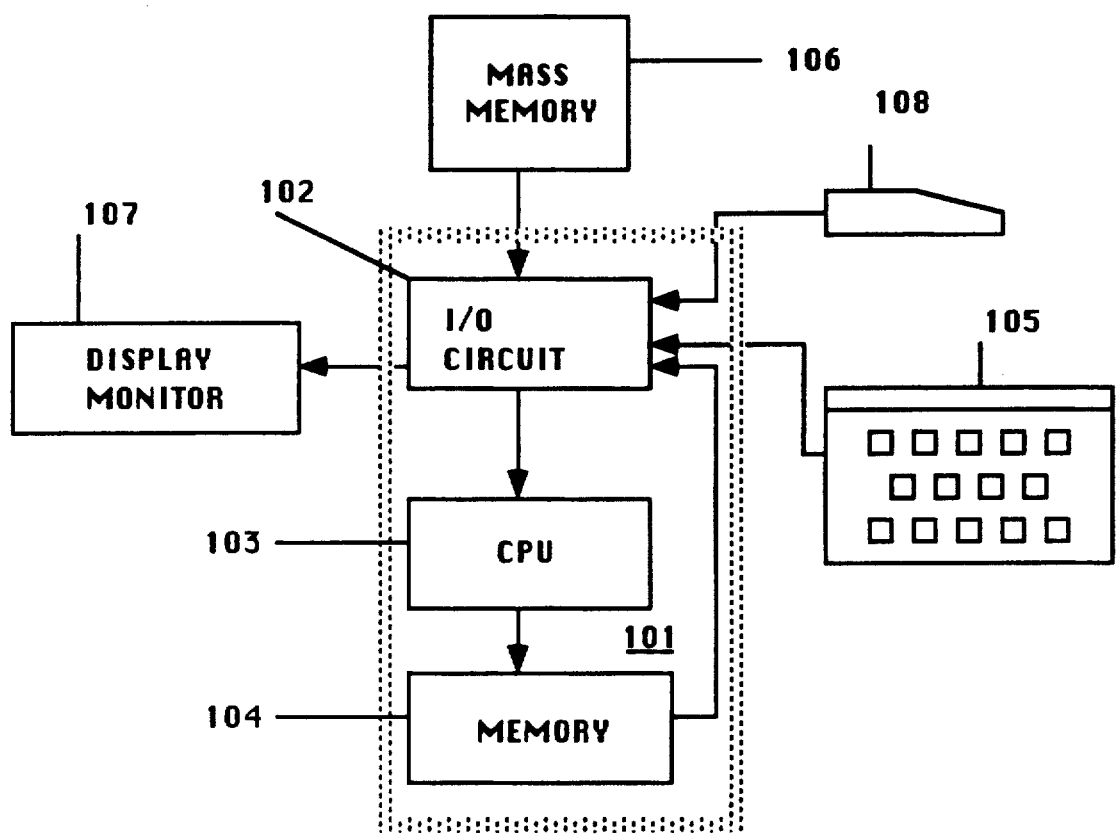
FIG. 1 is a typical computer based system for implementing the window-based measuring device of the present invention.

FIG. 1 shows a typical computer-based system for benchmarking of window-based systems according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having like capabilities may of course be adapted in a straightforward manner to perform the functions described below.

Also shown in FIG. 1 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user. Such a display monitor may take the form of any of several well-known varieties of CRT displays. A cursor control 108 is used to select command modes and edit the input data, and in general provides a more convenient means to input information into the system.

Process Description

The system of the present invention measures the working set of the system to determine the performance of the distributed window system according to events which occur during execution of processes by the system. A synchronized journaling mechanism is used in conjunction with a paging analysis tool to perform paging analysis at predetermined points during execution of a sequence of events representative of user actions which simulate a user session in a window-based system.

The working set is the set of all pages in memory referenced during the execution of a process. The amount of paging performed during execution of the process is a significant factor which effects system performance because paging is a time consuming process in which pages of information are swapped in and out of memory. The more paging that is performed, the longer the execution time of the process.

It has been found that the utilization of shared libraries by multiple processes increases system performance. Processes that utilize shared libraries can share the pages that belong to the libraries, thereby decreasing the amount of paging required during process execution. Increased performance has been found when shared libraries have been implemented into window systems. In window based systems, the libraries which form the windows system toolkit can be structured to be shared as it is structured in the X11/NeWS window system. To further increase performance of the system, it is desirable to measure the paging which occurs with respect to the shared libraries.

An event driven synchronized journaling mechanism is used in performing the benchmark. Synchronization events are installed into the journal file at predetermined points where processing for a second event is dependent upon the completion of execution of processing for a first event. The synchronized journaling mechanism controls the progress through the journal file by halting initiation of events subsequently listed in the journal file and waiting until certain specified synchronization events occur before proceeding to the next action to be initiated and executed. Thus the execution speed of the text can be increased during playback, the proper states can be maintained between multiple processes which interact and exchange state with one another, and the errors which arise due to race conditions can be avoided. The synchronized journaling mechanism is described is Islam, Ingoglia, "Testing Window Systems", *Interfaces: Systems and People Working Together*, 28th Annual Technical Symposium, ACM, Washington, D.C., pp. 95-103 (1989), and copending U.S. patent application Ser. No. 07/498,206, filed Mar. 23, 1990, entitled, "Synchronized Journaling System".

A paging analysis tool is integrated with the synchronized journaling mechanism to provide an event driven journaling system which measures the working space of the system at predetermined points during the execution of the texts which form the benchmark. The paging analysis tool accesses the memory management unit of the computer system, reviews the page tables which comprise the address space of the system and determines those pages that have been referenced during system operation. Preferably, a paging analysis tool such as the one described in U.S. patent application Ser. No. 07/411,036, filed Sept. 21, 1989, entitled "Method and Apparatus for Extracting Process Performance Information From a Network" is used. In this paging analysis tool, a duplicate or back copy of the page table of each monitored process is maintained. Thus, whenever the page tables are changed according to read, write or paging operations, the changes are subsequently recorded in the back copies. The back copies are accessible and controllable by the paging analysis tool throughout the benchmark. Although, the following description of the preferred embodiment describes operations in which the back copies of the page tables are read, it will be apparent to one skilled in the art that the system of the present invention equally applies to paging analysis tools in which the page tables are read and cleared.

Figure 2:
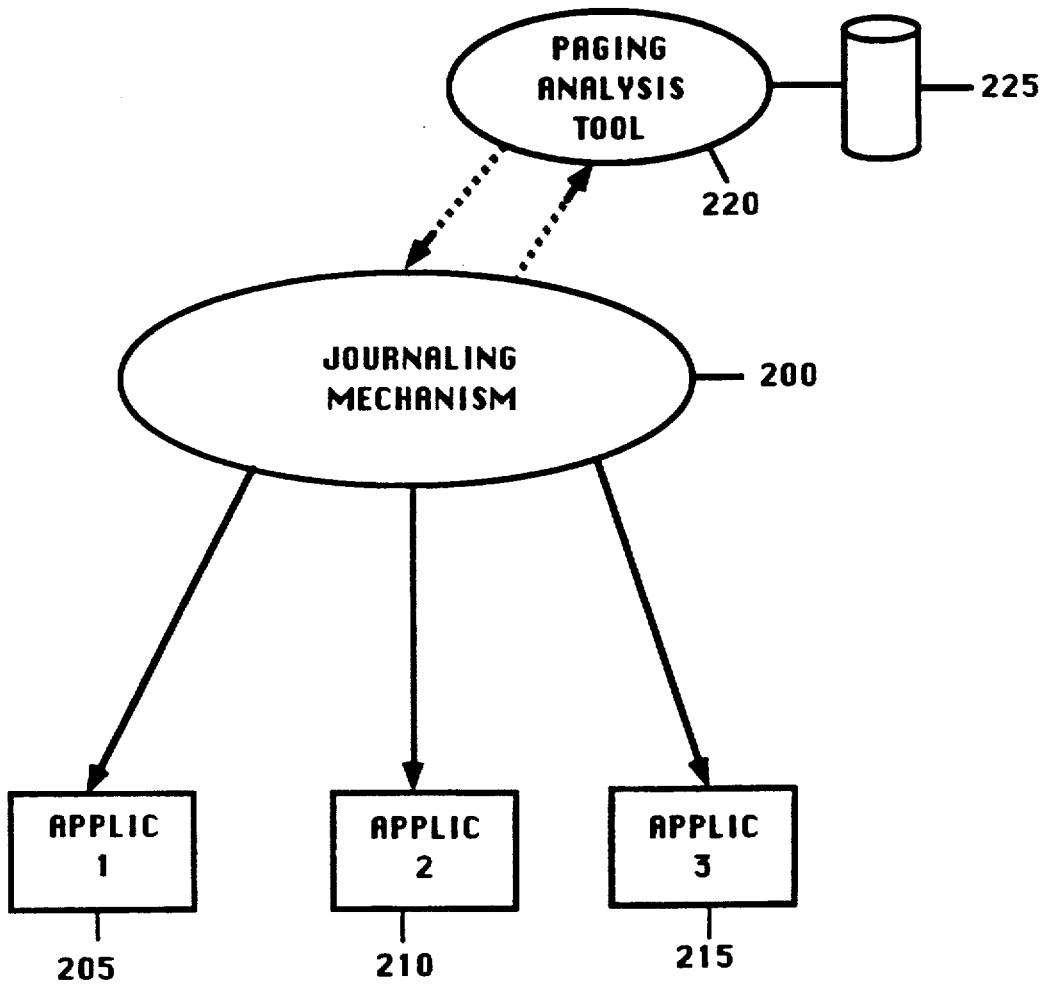
FIG. 2 is a block diagram functional representation of the system of the present invention.

The journaling mechanism controls the operation of the paging analysis tool to indicate when the address space is to be examined to calculate the working set for a particular section of the benchmark. This is illustrated by FIG. 2. The synchronized journaling mechanism 200 reads the journal file and initiates the events as listed in sequence. In the present illustration, the events include executing processes 205, 210, 215, as part of the benchmark. In addition, the synchronized journaling mechanism communicates with the paging analysis tool 220 to read the page tables (in the preferred embodiment, a back copy of the page tables) at predetermined points during initiation of events listed in the journal file and store copies of the page tables in a file 225.

Preferably a separate connection is provided to establish communications between synchronized journaling mechanism and the paging analysis tool. For example, in the UNIX ® operating system (UNIX is a registered trademark of AT&T), a "socket-connection" can be opened between processes which establishes a channel for communicating bits of information between processes. For further information regarding socket connections, see J. Bach, *The Design of the UNIX Operating System*, (Prentice-Hall, 1986) pp. 283-388. Thus, in the preferred embodiment, the synchronizated journaling mechanism opens a socket connection to the page analysis tool to transmit commands to the page analysis tool and to receive signals from the paging analysis tool.

Two events are provided in the synchronized journaling mechanism which, when executed, transmit commands to the paging analysis tool. The first, referred to as the clear page tables or "dehat" command, clears the back copies of the page tables maintained for each process in the memory management unit of the computer system. The second, referred to as the read page tables or "snapshot" command reads the back copies of the page tables from the memory management unit and copies the tables into a file for subsequent review and analysis. These commands incorporate synchronization events such that progression through the journal file is halted and subsequent events in the journal file are not initiated until execution of the commands is complete, thereby ensuring the measurements taken accurately reflect the state of the page tables at the location in the journal file where the command is located.

Once the execution of the last process listed in the journal file is finished, the replay sequence is complete and the synchronized journaling mechanism initiates a process to analyze the page tables read and copied to storage to compute the working set for each page table, thereby providing paging information regarding both private and shared files which are indicative of the performance of the system during the benchmark.

The paging analysis tool is modified to receive and execute the commands issued by the synchronized journaling mechanism. Furthermore, the paging analysis tool is modified to output a signal to the synchronize journaling mechanism to indicate that execution of the command is complete and the journaling mechanism may continue initiating the actions listed in the journal file.

Figure 3:
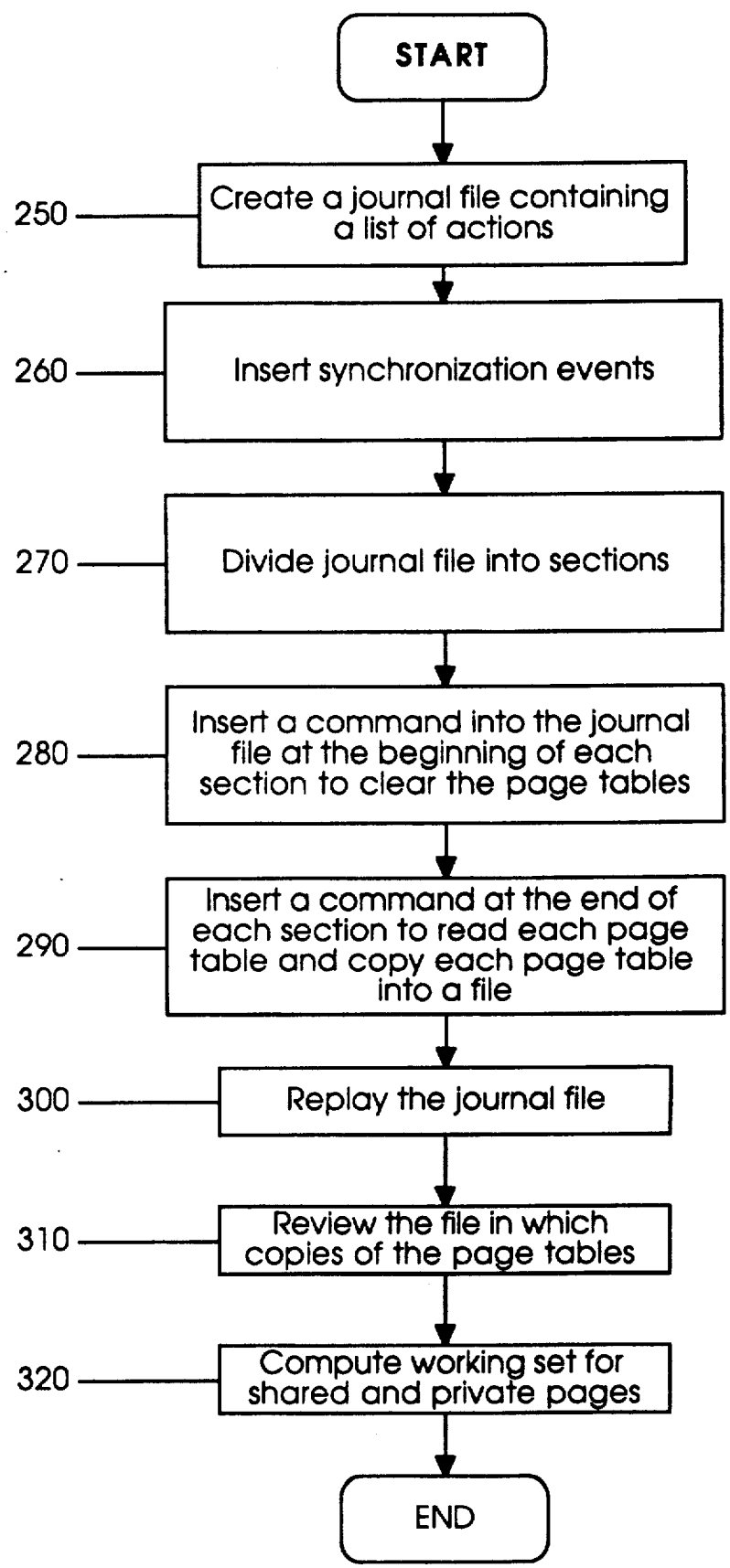
FIG. 3 is flowchart illustrating the benchmarking process.

The process of computing the working set for systems which utilized shared libraries is illustrated by the flowchart of FIG. 3. At block 250, a journal file is created. The journal file may be created by "capturing" an actual user session during which a user performed a variety of tasks. Preferably the journal file is created by capturing a user session which follows a script of user actions reflective of a typical user session on the computer system. An example of a script file which provides instructions regarding the user actions to perform as part of the benchmark is illustrated by FIG. 4. This script file shows a simple user session in a window based system in which the user starts a plurality of applications or client processes, including "console", "cmdtool", "textedit" and "mailtool", and performs a variety of tasks, including, opening and closing windows, moving between windows and changing the focus from one window to another, as well as performing a variety of tasks within the client processes initiated.

The events codes generated when actions are taken which are representative of the actions executed by the user to perform a task, for example, moving the cursor to a window, clicking a button on the mouse to change the focus in the window system to the current window and clicking on an icon resident in the current window to perform a certain task, are captured as the event code is transmitted to the components of the computer system which execute the action. Thus the actions can easily be re-initiated by outputting the same event code from the journal file during replay. Alternatively, the journal file can be simply created by manually inputting the event codes representative of actions to be executed to perform certain tasks. The synchronized journaling mechanism subsequently "replays" the events representative of user actions contained in the journal file wherein each action listed is initiated in sequence and executed thereby simulating the user session.

Preferably, the events representative of actions to be performed which are captured and stored in the journal file are in the XDR format which is a binary format standard used across multiple computer architectures. (For information regarding the XDR format, see Sun Microsystems, Inc., *Network Programming*, revision A, (May 9, 1988)). Alternatively, the journal file may be stored in ASCII text format such that the journal file is portable across different computer systems and the user can easily review and modify the journal file as needed to customize a journal file or fine tune the actions executed to provide further insight into the performance of the computer systems on which the benchmark is performed. For example, the format of each event in the journal file may be:

timestamp x y keystroke nameofevent,

Where the timestamp records the time when the event occurred, the x, y fields record the coordinates of the pointer at the time of the event, the keystroke field represents the state of the keys or keystrokes (it is null for mouse events) and the nameofevent field stores the name or class of the event. However, the system is not limited as such and the codes stored in the journal file can be in any format understandable by the journaling mechanism such that during replay, the events listed in the journal file representative of user actions are initiated and executed.

Referring again to FIG. 3, block 260, in order to insure accurate replay of the user session recorded and stored in the journal file, synchronization events are input into the journal file. The number and location of synchronization events input are dependent on the events and tasks performed during the recorded user session. The synchronization events are installed at those locations in the journal file after an event, representative of a user action, which must complete processing prior to the initiation of a subsequent event because the processing of the subsequent event is dependent on the process state of the completion of the prior event. The synchronization event indicates the event (or events) that is to be completed before any further events are initiated. The journaling mechanism, during replay, will halt further initiation of events until a signal is received by the journaling mechanism indicating that processing for the event identified in the synchronization event has completed execution.

Preferably, synchronization events are input at locations in the script between events which exchange state during processing. These synchronization events may be manually input by the user after the journal file is created or may be input by an automated process which reviews the events in the journal file and determines those events which require completed execution before initiating further actions. Preferably, the synchronization events are automatically input to the journal file according to the events representative of user actions captured. The toolkit, which interfaces the client processes to the window system, as well as the window server and window manager are modified to output a synchronization event that is captured by the synchronized journaling mechanism and placed in the journal file. The toolkit, window system, window server and window manager, are further modified to provide a signal to the synchronized journaling mechanism, during replay of the journal file, when it completes processing of events identified by the synchronization event such that the synchronized journaling mechanism knows when processing of events are complete and subsequent events can be initiated.

At block 270, FIG. 3, the events listed in the journal file are divided into sections. The sections are divided according to the synchronization points in the user session at which it is desirable to review the page tables in order to measure the working space and performance of the system. The sections may be created manually by the user after creation of the journal file or may be created by an automated process which creates the sections according to a predetermined criteria. Preferably, the synchronization points are located, and thus the sections are created, according to the performance measurements to be taken. For example, the sections may be created to divide each event into individual sections such that the effect each event has on the working space of the system can be measured. Alternatively, each section may contain the events performed relevant to a particular task, or those events which occur within a particular window.

At the event locations in the journal file indicative of the beginning of a section, the event is inserted which, when executed during replay, causes a command to be sent to the paging analysis tool to clear the back copies of the page tables in the memory management unit of the computer system (block 280, FIG. 3).

Similarly, at the locations in the journal file indicative of the end of a section, the event is inserted which, when executed during replay, causes a command to be sent to the paging analysis tool to read the back copies of the page tables in the memory management unit of the computer system and store them in a file (block 290, FIG. 3).

These events incorporate synchronization events, such that during replay, the journaling mechanism will not initiate further events from the journal file until a signal is received from the paging analysis tool indicating that execution of the commands initiated are complete. This insures that the measurements taken accurately reflect the measurements for the section and do not include paging information for a subsequent section.

Once these steps are performed, the journal file is complete and ready to be replayed to perform benchmarking measurements. An example of a script which is used to generate a journal file including synchronization events and actions to perform measurements of the working space generated for the script of FIG. 4 is illustrated by FIG. 5. An ASCII text version of the corresponding journal file is illustrated by FIG. 6. Referring to FIG. 6, the synchronization events are noted at those lines beginning with "s". For example at line 410 a synchronization event is installed to synchronize with "/GetKeyState". Thus during replay, the synchronized journaling mechanism will wait until the processing with respect to /GetKeyState is complete before continuing initiation of events starting with line 415. Similarly, the synchronization event at line 420 will cause the journaling mechanism to wait until the actions "/SubUnviewableNotify /UnviewableNotify /UnmapNotify /DoItEvent /DoItEvent" are complete before initiating the action at line 425.

The events to control the paging analysis tool are noted at those lines beginning with "w". In the present illustration the command "/F3-done", is the event which represents the dhat command to cause the paging analysis tool to clear the back copies of the page tables so that an accurate measurement of the working set for the section of the journal file can be achieved. The command at line 430 "/F4_done" is located after the last action to be taken and is the event which represents the "snapshot" command issued to the paging analysis tool to cause the back copies of the page tables to be read and stored in a file.

At block 300, FIG. 3, to benchmark the computer system, the journal file is replayed by the synchronized journaling mechanism. The events listed in the file are initiated in the sequence listed. When a synchronization event is reached, the synchronized journaling mechanism halts initiation of subsequent events until a signal is received indicating that process execution of the event identified by the synchronization event is complete. Furthermore, when an event to clear the back copies of the page tables is reached in the file, initiation of subsequent events in the file is halted, the command is sent to the paging analysis tool which clears the back copies of the page tables and sends back a signal to the synchronized journaling mechanism indicating that the execution of the command is complete. Similarly, when the event to read and copy the back events in the file is halted, the command is sent to the paging analysis tool which reads the page tables, copies them into a file and sends back a signal to the synchronized journaling mechanism indicating that the execution of the command is complete.

At the end of the replay process, at block 310, the file containing the copies or snapshots of the page tables are reviewed and analyzed to determine the working sets for the different sections of the user session. FIG. 7 is illustrative of page tables copied for a section in a file pursuant to commands issued by the synchronized journaling mechanism of the present invention. Page tables for four processes, textedit, mailtool, cmdtool and cmdtool, are respectively identified by process identification numbers 2244, 2246, 2238 and 2241. The character "R" indicates that a shared page has been referenced and the character "X" indicates that a private page has been referenced. The characters "a", "w" and "r" identify unreferenced shared pages and "x" identifies unreferenced private pages. The page tables for each section are reviewed and a count of the number of shared and private pages referenced during a section is made. From this information, at block 320, the working set for each section can be determined.

It has been determined that for benchmarking a variety of systems, an accurate representation of the working set of a computer system can be defined to be the average of the working set of the application processes that are part of the benchmark. The average working set for the benchmark for a system consisting of shared and private pages is defined as: ws=[average shared pages]+(np)*[average private pages per process]; or $$ws = (1/ns) * \sum_{i=1}^{ns} x_i + \left[ \frac{1}{(np*ns)} * \sum_{i=1}^{ns} \sum_{j=i}^{np} y_{ij} \right]$$

Where np is the number of processes executing during the benchmark, ns is the number snapshot points, $x_i$ the number of shared pages in snapshot i, $y_{ij}$=the number of private pages in snapshot i for a process j, and ws is the working set of a the benchmark in pages. Similarly, for a system consisting of only private pages the working set is for the benchmark is defined as:

$$ws = \left[ \frac{1}{(np*ns)} \right] * \sum_{i=1}^{ns} \sum_{j=i}^{np} y_{ij}$$

Through the analysis of the working set of private and shared memory, including shared libraries, benchmarking of systems can be implemented across a variety of systems and architectures.

While the invention has been described in conjunction with the preferred embodiment, it is evident that numerous alternative, modifications, variations, and uses will be apparent to those skilled in the art in light of the foregoing description.

What is claimed is:

1. In a computer system comprising a central processing unit (CPU), memory divided into pages, said memory being identified by its address space and the status of memory being defined by at least one page table which indicates if a page has been referenced, input/output devices comprising a keyboard, mouse and display, said CPU executing at least one application process, said application process during execution accessing memory, a system for benchmarking the performance speed of the computer system comprising:

means for inputting information to the computer system through the input/output devices, said information representative of user actions taken during a user session, said computer system executing processes in response to the information input;

means for storing events in a journal file, representative of the input information representative of user actions, said events during replay being executed, whereby the input of information representative of user actions is simulated and the computer system executes processes in response to the events;

means for inputting into the journal file synchronization events, said synchronization events being located between first and second events, the second event being dependent upon completion of execution of the first event, said synchronization event identifying the first event to be completed before executing the second event;

means for dividing the journal file into sections;

means for inputting into the journal file at locations which are at a beginning of a section, an event, which when executed, clears the page table, such that the page table shows that no pages have been referenced;

means for inputting into the journal file at locations which are at each end of a section an event which, when executed, causes the page table to be read and stored in a file;

means for replaying the journal file comprising:
means for executing events listed in the journal file in the sequence listed in the journal file,
when a synchronization event is executed, means for halting execution of subsequent events listed in the journal file until the event identified by the synchronization event has completed execution,
when an event to clear the page table is executed, means for halting initiation of subsequent events until the event has completed execution and means for clearing the page table; and
when an event to read the page table is executed, means for halting initiation of subsequent actions until the event has completed execution, means for reading the page table and means for storing a copy of the page table in file; and once all events have been executed;
means for reading the file which comprises the page tables stored,
means for summing the number of occurrences of referenced pages in each stored page table for each section, and
means for determining the working set for each section from the number of referenced pages;
whereby the working set is indicative of the performance of the system and benchmarking is performed by replaying the journal file and determining the working sets.

2. The system for benchmarking the performance speed of the computer system as set forth in claim 1, wherein the working set is determined according to the equation:

$$ws = \left[\frac{1}{(np*ns)}\right] * \sum_{i=1}^{ns} \sum_{j=i}^{np} y_{ij}$$

where np is the number of processes executing during the benchmark, ns is the number of sections, $y_{ij}$=the number of pages in section i for a process j, and ws is the working set of the benchmark in pages.

3. The system for benchmarking the performance speed of the computer system as set forth in claim 1, wherein the memory comprises shared and private pages and the working set is determined according to the equation:

$$ws = (1/ns) * \sum_{i=1}^{ns} x_i + \left[\frac{1}{(np*ns)} * \sum_{i=1}^{ns} \sum_{j=i}^{np} y_{ij}\right]$$

where np is the number of processes executing during the benchmark, ns is the number of sections, $x_i$ the number of shared pages in section i, $y_{ij}$=the number of private pages in section i for a process j, and ws is the working set of the benchmark in pages.

4. The system for benchmarking the performance speed of the computer system as set forth in claim 1, wherein the computer system comprises a window system and the means for storing events in the journal file comprises:

means for expressing an interest in events representative of the information input to the computer system by the input/output devices;

whereby copies of the events are provided to the means for storing events and the events received are stored in the journal file.

5. The system for benchmarking the performance speed of the computer system as set forth in claim 1, wherein the computer system comprises a window system whereby multiple windows can be established and events can be executed in different windows, and the means for dividing the journal file into sections divides the events listed in the journal file in sections according to the window the events are executed in.

6. The system for benchmarking the performance speed of the computer system as set forth in claim 1, wherein, said means for clearing the page table, means for sending a signal indicating that execution of the event has completed execution, means for reading the page table and means for sending a signal indicating that the event has completed execution comprises a paging analysis tool comprising;

means for creating a back copy of each page table whereby if the page table is updated, the back copy of the page table is updated;

means for clearing the back copy of the page table upon receipt of a command indicating that the page table is to be cleared;

means for reading the back copy of the page table and storing the back copy of the page table read in a file upon receipt of a command indicating that the page table is to be read; and means for sending a signals to the means for executing events indicating that the page table has been cleared or the page table has been read and subsequent events can be executed;

said command to read the page table and command to clear the page table being sent to the paging analysis tool by the means for executing the events when the event to read the page table and the event to clear the page table are respectively executed.

7. In a computer system comprising a central processing unit (CPU), memory divided into pages, said memory being identified by its address space and the status of memory being defined by at least one page table which indicates if a page has been referenced, input/output devices comprising a keyboard, mouse and display, said CPU executing at least one application process, said application process during execution accessing memory, a system for benchmarking the performance speed of the computer system comprising:

means for inputting information to the computer system through the input/output devices, said information representative of user actions taken during a user session, said computer system executing processes according to the information input;

means for storing events in a journal file representative of the input information representative of user actions, said events during replay being executed, whereby the input of information representative of user actions is simulated and the computer system executes processes in response to the event;

means for inputting into the journal file synchronization events, said synchronization events being located between first and second events, the second event being dependent upon completion of execution of the first event, said synchronization event identifying the first event to be completed before executing the second event;

means for inputting into the journal file an event which clears the page table, such that the page table shows that no pages have been referenced;

means for inputting into the journal file an event which causes the page table to be read and stored in a file;

means for replaying the journal file comprising:

means for executing events listed in the journal file in the sequence listed in the journal file, when a synchronization event is executed, means for halting execution of subsequent events listed in the journal file until the event identified by the synchronization event has completed execution, when an event to clear the page table is initiated, means for halting execution of subsequent events until the event has completed execution and means for clearing the page table;

when an event to read the page table is initiated, means for halting execution of subsequent actions until the event has completed execution, means for reading the page table, and means for storing a copy of the page table in a file; and once all events have been executed, means for reading the file which comprises the page tables stored, means for summing the number of occurrences of referenced pages in each stored page table for each event to read the page table, and means for determining the working set for each section from the number of referenced pages;

whereby the working set is indicative of the performance of the system and benchmarking is performed by replaying the journal file and determining the working sets.

8. The system for benchmarking the performance speed of the computer system as set forth in claim 7, wherein the working set is determined according to the equation:

$$ws = \left[\frac{1}{(np*ns)}\right] \cdot \sum_{i=1}^{ns} \sum_{j=i}^{np} y_{ij}$$

where np is the number of processes executing during the benchmark, ns is the number of sections, $y_{ij}$=the number of pages in section i for a process j, and ws is the working set of the benchmark in pages.

9. The system for benchmarking the performance speed of the computer system as set forth in claim 7, wherein the memory comprises shared and private pages and the working set is determined according to the equation:

$$ws = (1/ns) \cdot \sum_{i=1}^{ns} x_i + \left[\frac{1}{(np*ns)} \cdot \sum_{i=1}^{ns} \sum_{j=i}^{np} y_{ij}\right]$$

where np is the number of processes executing during the benchmark, ns is the number of sections, $x_i$ the number of shared pages in section i, $y_{ij}$=the number of private pages in section i for a process j, and ws is the working set of the benchmark in pages.

10. The system for benchmarking the performance speed of the computer system as set forth in claim 7, wherein the computer system comprises a window system and the means for storing events in the journal file comprises:

means for expressing an interest in events representative of the information input to the computer system by the input/output devices;

whereby copies of the events are provided to the means for storing events and the events received are stored in the journal file.

11. The system for benchmarking the performance speed of the computer system as set forth in claim 7, wherein the computer system comprises a window system whereby multiple windows can be established and events can be executed in different windows, and the means for dividing the journal file into section divides the events listed in the journal file in sections according to the window the events are executed in.

12. The system for benchmarking the performance speed of the computer system as set forth in claim 7, wherein, said means for clearing the page table, means for sending a signal indicating that execution of the event has completed execution, means for reading the page table and means for sending a signal indicating that the event has completed execution comprises a paging analysis tool comprising;

means for creating a back copy of each page table whereby if the page table is updated, the back copy of the page table is updated;

means for clearing the back copy of the page table upon receipt of a command indicating that the page table is to be cleared;

means for reading the back copy of the page table and storing the back copy of the page table read in a file upon receipt of a command indicating that the page table is to be read; and means for sending a signals to the means for executing events indicating that the page table has been cleared or the page table has been read and subsequent events can be executed;

said command to read the page table and command to clear the page table being sent to the paging analysis tool by the means for executing the events when the event to read the page table and the event to clear the page table are respectively executed.

13. In a computer system comprising a central processing unit (CPU), memory divided into pages, said memory being identified by its address space and the status of memory being defined by at least one page table which indicates if a page has been referenced, input/output devices comprising a keyboard, mouse and display, said CPU executing at least one application process, said application process accessing memory, a process for benchmarking the performance speed of the computer system when performing a plurality of user actions representative of a user session, said process comprising the steps of:

inputting information to the computer system through the input/output devices, said information representative of user actions, said computer system executing processes in response to the information input;

storing events in a journal file representative of the input information representative of user actions, said events during replay being executed whereby the input of information representative of user actions is simulated and the computer system executes processes in response to the events;

inputting into the journal file synchronization events, said synchronization events being located between first and second events, the second event being dependent upon completion of execution of the first event, said synchronization event identifying the first event to be completed before executing the second event;

separating the events listed in the journal file into sections;

inputting into the journal file at locations which are at a beginning of a section, an event which, when executed, clears the page table, such that the page table shows that no pages have been referenced;

inputting into the journal file at locations which are at each end of a section an event which, when executed, causes the page table to be read and stored in a file;

replaying the journal file such that,
execution of the events listed in the journal file are executed in the sequence listed in the journal file,
when a synchronization event is initiated, halting execution of subsequent events listed in the journal file until the event identified by the synchronization event has completed execution,
when an event to clear the page table is initiated, halting execution of subsequent events in the journal file, clearing the page table, and once the page table is cleared, continuing execution of subsequent events in the journal file; and when an event to read the page table is initiated, halting execution of subsequent actions, reading the page table and storing a copy of the page table in a file, and once the copy of the page table is stored in a file, continuing execution of the events listed in the journal file; and once all events have been initiated and execution of the events is complete, reading the file which comprises the page tables stored, summing the number of occurrences of referenced pages in each stored page table for each section, and determining the working set for each section from the number of referenced pages;

whereby the working set is indicative of the performance of the system and benchmarking is performed by replaying the journal file and determining the working sets.

14. The process for benchmarking the performance speed of the computer system as set forth in claim 13, wherein the working set is determined according to the equation:

$$ws = \left[ \frac{1}{(np^*ns)} \right] \cdot \sum_{i=1}^{ns} \sum_{j=i}^{np} y_{ij}$$

where np is the number of processes executing during the benchmark, ns is the number of sections, $y_{ij}$=the number of pages in section i for a process j, and ws is the working set of the benchmark in pages.

15. The process for benchmarking the performance speed of the computer system as set forth in claim 13, wherein the memory comprises shared and private pages and the working set is determined according to the equation:

$$ws = (1/ns) \cdot \sum_{i=1}^{ns} x_i + \left[ \frac{1}{(np^*ns)} \cdot \sum_{i=1}^{ns} \sum_{j=i}^{np} y_{ij} \right]$$

where np is the number of processes executing during the benchmark, ns is the number of sections, $x_i$ the number of shared pages in section i, $y_{ij}$=the number of private pages in section i for a process j, and ws is the working set of the benchmark in pages.

16. The system for benchmarking the performance speed of the computer system as set forth in claim 13, wherein the computer system comprises a window system whereby multiple windows can be established and events can be executed in different windows, and the step of separating the journal file into sections divides the events listed in the journal file in sections according to the window the events are executed in.

17. In a computer system comprising a central processing unit (CPU), memory divided into pages, said memory being identified by its address space and the status of memory being defined by at least one page table which indicates if a page has been referenced and the type of page referenced, input/output devices comprising a keyboard, mouse and display, said computer system further comprising a window system, said CPU executing at least one application process in a window established through the window system, said application process accessing memory including a library located in memory which is shared and accessed by more than one application process, a process for benchmarking the performance speed of the computer system when performing a plurality of user actions representative of a user session, said process comprising the steps of:

inputting information to the computer system through the input/output devices, said information entered through windows of the window system, said information representative of user actions, said computer system executing processes in response to the information input;

storing events in a journal file representative of the input information representative of user actions, said events during replay being executed whereby the input of information representative of user actions is simulated and the computer system executes processes in response to the events;

inputting into the journal file synchronization events, said synchronization events being located between first and second events, the second event being dependent upon completion of execution of the first event, said synchronization event identifying the first event to be completed before executing the second event;

separating the events listed in the journal file into sections;

inputting into the journal file at locations which are at a beginning of a section, an event which clears the page table, such that the page table shows that no pages have been referenced;

inputting into the journal file at locations which are at each end of a section an event which causes the page table to be read and stored in a file;

replaying the journal file such that, execution of the events listed in the journal file are executed in the sequence listed in the journal file, when a synchronization event is executed, halting execution of subsequent events listed in the journal file until the event identified by the synchronization event has completed execution, when an event to clear the page table is initiated, halting execution of subsequent events in the journal file, clearing the page table, and once the page table is cleared, continuing execution of subsequent events in the journal file; and when an event to read the page table is initiated, halting execution of subsequent actions, reading the page table and storing a copy of the page table in a file, and once the copy of the page table is stored in a file, continuing execution of the events listed in the journal file; and once all events have been initiated and execution of the events is complete, reading the file which comprises the page tables stored, summing the number of occurrences of the shared pages and private pages in each stored page table for each section, and determining the working set for each section, said working set determined according to the equation:

$$ws = (1/ns) \cdot \sum_{i=1}^{ns} x_i + \left[ \frac{1}{(np^*ns)} \cdot \sum_{i=1}^{ns} \sum_{j=i}^{np} y_{ij} \right]$$

where np is the number of processes executing during the benchmark, ns is the number of sections, $x_i$ the number of shared pages in section i, $y_{ij}$=the number of private pages in section i for a process j, and ws is the working set of the benchmark in pages;

whereby the working set is indicative of the performance of the system and benchmarking is performed by replaying the journal file and determining the working sets.

* * * * *

UNITED STATES PATENT AND TRADEMARK OFFICE
CERTIFICATE OF CORRECTION

| | | |
|---|---|---|
| PATENT NO. | : | 5,086,386 |
| DATED | : | February 4, 1992 |
| INVENTOR(S) | : | Islam |

It is certified that error appears in the above-identified patent and that said Letters Patent is hereby corrected as shown below:

In column 2 at line 8, please delete " View TM " and insert -- View $^{TM}$ --.

Signed and Sealed this

Fifteenth Day of July, 1997

Attest:

BRUCE LEHMAN

Attesting Officer

Commissioner of Patents and Trademarks